US007558982B2

(12) United States Patent
Blohm (10) Patent No.: US 7,558,982 B2
(45) Date of Patent: Jul. 7, 2009

(54) PRESENCE ENHANCED DISASTER/OVERLOAD RECOVERY

(75) Inventor: Jeffrey M. Blohm, Portola Valley, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 441 days.

(21) Appl. No.: 11/514,784

(22) Filed: Sep. 1, 2006

(65) Prior Publication Data
US 2008/0059552 A1    Mar. 6, 2008

(51) Int. Cl.
*G06F 11/00* (2006.01)
(52) U.S. Cl. .............................. 714/15; 714/2
(58) Field of Classification Search ............... 714/2–4, 714/15, 16
See application file for complete search history.

(56) References Cited

U.S. PATENT DOCUMENTS

| 6,490,690 | B1 * | 12/2002 | Gusler et al. ............... 714/4 |
| 7,031,984 | B2 * | 4/2006 | Kawamura et al. ....... 707/104.1 |
| 7,178,059 | B2 * | 2/2007 | Greenspan et al. ............ 714/13 |
| 7,266,718 | B2 * | 9/2007 | Idei et al. ...................... 714/6 |
| 2005/0027571 | A1 * | 2/2005 | Gamarnik et al. ............. 705/4 |
| 2005/0193248 | A1 * | 9/2005 | Idei et al. ...................... 714/13 |
| 2005/0283504 | A1 * | 12/2005 | Suzuki et al. ............... 707/202 |
| 2007/0211628 | A1 * | 9/2007 | Ikeda et al. ................. 370/230 |

* cited by examiner

*Primary Examiner*—Dieu-Minh Le (57) ABSTRACT

In some embodiments, a managed content recovery system may include one or more of the following features: (a) a data storage device comprising, (i) presence state submitted from at least one user, and (ii) a managed content recovery program that distributes managed content that has been backed up due to a backlog based upon at least one user's presence state, and (b) a processor coupled to the data storage device that executes the managed content recovery program.

19 Claims, 5 Drawing Sheets

PRESENCE ENHANCED DISASTER/OVERLOAD RECOVERY

FIELD OF THE INVENTION

This invention relates to presence and presence management systems that communicate presence information. In particular, this invention relates to the combined use of presence information with other systems. More particularly, this invention relates to the use of presence information to enhance the ability of a system to recover from disasters or overload conditions.

BACKGROUND OF THE INVENTION

In computer and telecommunications networks, presence information conveys the availability and willingness of a user (called a presentity) to communicate. A user's client provides presence information to a presence service to be stored and distributed to other users (called watchers) to convey the user's communication state. Presence information has wide application in voice over IP (VoIP) and instant messaging (IM) systems.

A user's client may publish a presence state to indicate its current communication status. This published state informs others that wish to contact the user of the user's availability and willingness to communicate. The most common use of presence today is the status indicator displayed on most instant messaging clients. A simpler everyday example is the 'on-hook' or 'off-hook' state of a telephone receiver, resulting in a distinctive ring tone for a caller. Some states that offer extended information on the user's availability are "free for chat", "away", "do not disturb", and "out to lunch", which are often seen on many modern instant messaging clients. Rich information such as user mood and location may be also included. Basically information published by a presentity has two parts, user information (the online, busy, in meeting, etc. states) and device information (whether the presentity is online and available for communications). The presence server then aggregates the information from all of the presentities associated with a single user and published a presence document. This presence document represents the availability of the user. "Hook status" can be either integrated into the aggregation calculation, or there could be a separate audio aggregation.

Users have the potential to publish different presence states depending on who the communicator (or watcher) is. A worker may only want colleagues to see detailed presence information during office hours, for instance. Some users may want to only publish information to a select few. Basic versions of this idea are already common in instant messaging clients as a 'Block' facility, where users can appear as unavailable to selected watchers.

Electronic mail, abbreviated e-mail or e-Mail or email, is a method of composing, sending, storing, and receiving messages over electronic communication systems. The term e-mail applies both to the Internet e-mail system based on the Simple Mail Transfer Protocol (SMTP) and to intranet systems allowing users within one company to e-mail each other. Often these workgroup collaboration organizations may use the Internet protocols for internal e-mail service.

For example, let's examine a typical sequence of events that takes place when Mary composes a message using her mail user agent (MUA). She types in, or selects from an address book, the e-mail address of her correspondent. She hits the "send" button. Her MUA formats the message in Internet e-mail format and uses the SMTP protocol to send the message to the local mail transfer agent (MTA), in this case smtp.a.org, run by Mary's Internet Service Provider (ISP).

The MTA looks at the destination address provided in the SMTP protocol (not from the message header), in this case ralph@b.org. A modern Internet e-mail address is a string of the form localpart@domain.example, creating a Fully Qualified Domain Address (FQDA). The part before the @ sign is the local part of the address, often the username of the recipient, and the part after the @ sign is a domain name. The MTA looks up this domain name in the Domain Name System (DNS) to find the mail exchange servers accepting messages for that domain.

The DNS server for the b.org domain, ns.b.org, responds with an MX record listing the mail exchange servers for that domain, in this case mx.b.org, a server run by Ralph's ISP. smtp.a.org sends the message to mx.b.org using SMTP, which delivers it to the mailbox of the user Ralph. Ralph presses the "get mail" button in his MUA, which picks up the message using the Post Office Protocol (POP3). Other methods can be used to retrieve messages as well, such as IMAP4 (Internet Message Access Protocol) or email systems such as Exchange/Outlook and Domino/Notes.

An Email MTA can go down or become backed up for many reasons, such as routine maintenance, Denial-Of-Service attacks, virus checking, server failure, etc. When this occurs, MTA's upstream from the downed MTA continue to receive and queue messages. When the MTA comes up again, it is faced with an often daunting amount of email to deliver. It can take hours or even days to clear the backlog.

Therefore, it is desirable to have a system that leverages presence information to prioritize the resource backlog, delivering the resource first to those users who are in presence states that indicate they are likely to want to access the resource and deferring delivery to other users who are not in those presence states.

SUMMARY OF THE INVENTION

In some embodiments, a method for managed content system recovery may include one or more of the following steps: (a) beginning a recovery process, (b) querying a presence system to determine a presence of each user, (c) distributing managed content based upon the user's presence, (d) distributing the managed content based upon the user's importance, (e) inputting a user's presence state, and (f) determining when the recovery process is complete.

In some embodiments, a managed content recovery system may include one or more of the following features: (a) a data storage device comprising, (i) presence state submitted from at least one user, and (ii) a managed content recovery program that distributes managed content that has been backed up due to a backlog based upon at least one user's presence state, and (b) a processor coupled to the memory that executes the managed content recovery program.

In some embodiments, a machine readable medium comprising machine executable instructions may include one or more of the following features: (a) query instructions to obtain the presence of participating presence users, (b) order instructions that order participating presence users based upon a priority table, (c) delivery instructions that deliver backlogged managed content based upon the participating presence users priority, and (d) creation instructions that create a list of all pending recipients of a managed content system.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Embodiments of the present invention use presence information to enhance the ability of a system (with random access to managed content) to recover from disasters or overload conditions. As a result, users will have more timely access to managed content after encountering such a condition. For disclosure purposes, email is used as the model of such a resource. However, it is fully contemplated that other resources, such as voice mail, standard mail, and instant messaging could be utilized without departing from the spirit of the invention.

Embodiments of the present invention enhance the resource delivery function so that it leverages presence information to prioritize the resource backlog. Thus, delivering the resource first to those users who are in presence states that indicate they are likely to want to access the resource and deferring delivery to other users who are not in those presence states. It is noted, this does not shorten the actual total time required to clear the backlog, but it will generally give active users the perception that the restoration process occurred more quickly than a strictly sequential restoration process would.

Embodiments of the present invention provide a way to enhance and prioritize the restoration of access to a resource such as email after a resource backlog has been created as a result of a disaster, service outage, or by slow processing. Restoration of access to a resource after a backlog has been created is usually done in a sequential manner, often based on the time the resource entered the backlog. Thus an MTA processes the email backlog from oldest message to newest message, regardless of the presence state of the email recipient. So emails destined for people out on vacation are given the same priority as emails for people who are in the office working. The invention uses presence information to prioritize restoration of access to the resource, favoring those users who are likely to be accessing the resource.

Although the above scheme utilizes one (or more) presence snapshots, an even more effective (though more costly to implement) method would be to subscribe to the presence of the resource recipients. This would allow the system to dynamically adjust to changes in presence of recipients in the most effective manner. For example, why continue delivering resource at a high priority to a user when he/she just went from "In Office" to "On Vacation".

Prior to this invention, most resource restoration occurred sequentially, based on the time that the resource entered the backlog. Restoration of the resource to the end users occurs without regard to the current state of the end user. Presently, an end user who is out on vacation has the same priority as the contact center agent sitting at his/her desk waiting for the next email to process. This has the disadvantage that users who will not likely be accessing the resource anytime soon delay the delivery of the resource to users who are actively waiting to work with it.

With embodiments of the present invention, in backlog or disaster recovery scenarios, users who are likely to need access to a resource are given priority over those who aren't likely to need access. These active users will have their resources recovered faster than other users.

Figure 1:
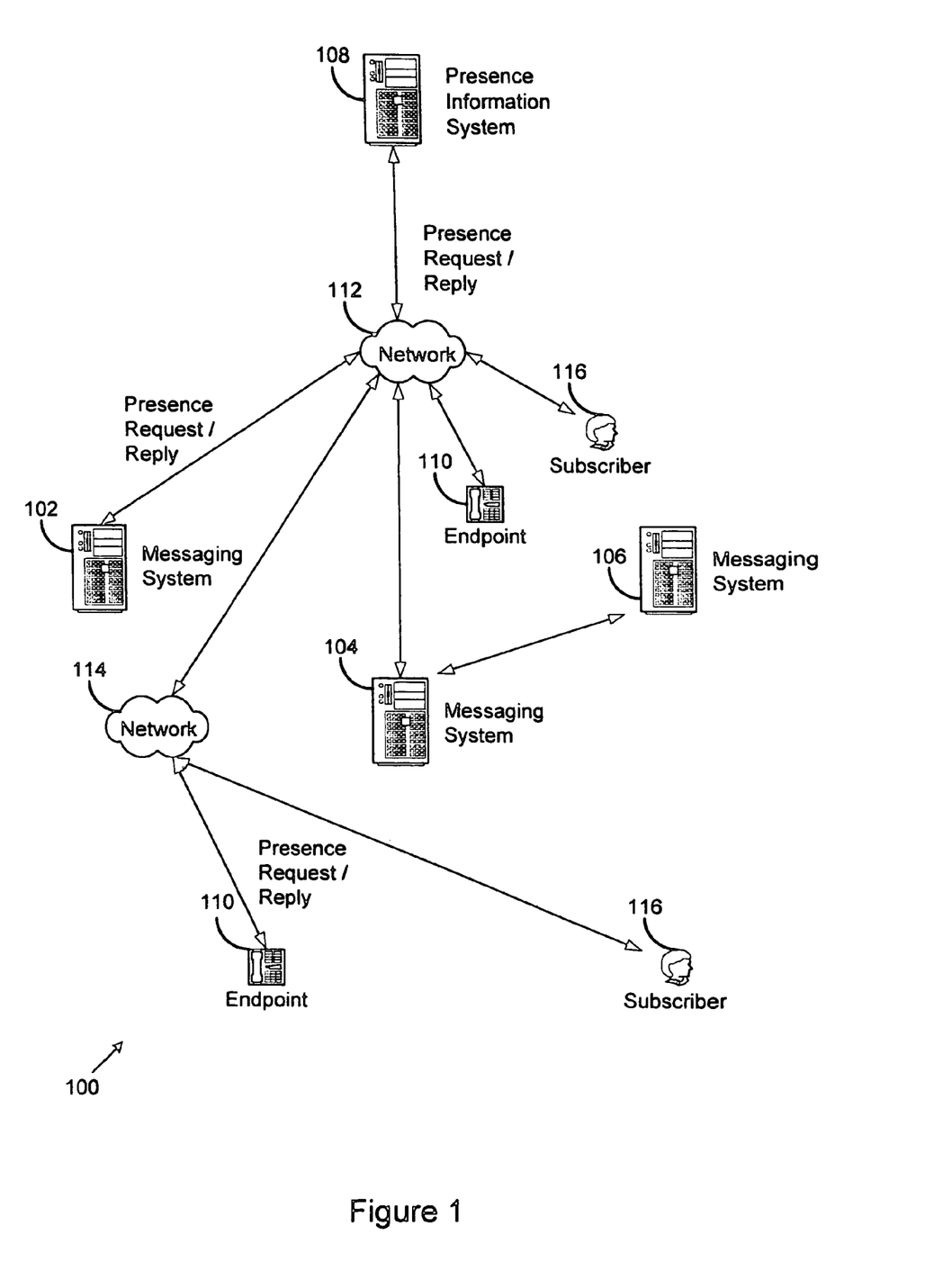
FIG. 1 shows one implementation of a presence network in an embodiment of the present invention.

With reference to FIG. 1, a presence system network 100 is shown. The entities interacting in the network 100 may include messaging systems 102, 104, and 106, a presence information system 108, endpoints 110, and/or other entities. The messaging systems 102-106 may subscribe to the presence information system 108 to obtain presence information. It is noted that messaging systems 102-106 are subscribers here. Messaging systems 102-106 are polling or subscribing to the presence of the end users who have resource delivery pending. As will be described in more detail below, the presence information system 108 may allow or block access to the presence information. The messaging systems 102-106 may be multimedia messaging systems, or may selectively process specific types of messages such as voice messages, fax messages, instant messages, or other messages. The messaging system 102-106 may, for example, represent home or business computers that execute messaging programs such as instant messaging programs, email programs, video conferencing programs, or other messaging programs. Presence information for a subscriber/user 116 may be communicated between the endpoints 110, the presence information system 108 and/or the messaging systems 102-106.

The entities may communicate over one or more networks 112, 114 or interconnection of networks. The entities 102-110 and networks 112, 114 may exchange information using a packet based protocol. For example, the messaging systems 102-106, presence information system 108, and endpoints 110 may employ the Session Initiation Protocol (SIP) over the User Datagram Protocol (UDP). Other protocols, including the Transmission Control Protocol/Internet Protocol (TCP/IP) or other network protocols may be additionally or alternatively employed. In addition, the signaling between the entities 102-110 may proceed according to the H.323 packet-based multimedia communications system standard published by the International Telecommunications Union (ITU). The network or interconnection of networks 112, 114 may include the Internet or the Public Switched Telephone Network (PSTN) and may deliver data to home or business computers, programs, PDAs, pagers, cell phones, wireline phones, internet phones, or any other communication device, electronic system, or system component or program.

The entities in the network 100 may employ protocols that adhere to any desired specification. For example, the entities may employ the Session Initiation Protocol (SIP) developed for Internet conferencing, telephony, presence, events notification and instant messaging, SIP for Instant Messaging and Presence Leveraging Extensions (SIMPLE), or the Extensible Messaging and Presence Protocol (XMPP). The form and content of the presence information may be established according to protocols consistent with the Internet Engineering Task Force (IETF) Request for Comments (RFC) 2778 or IETF RFC 2779. Alternatively, the entities may employ extensions to RFC 2778 or RFC 2779, or may employ proprietary protocols.

The subscribers 116 interact with the network 100. A subscriber may be any entity that may be associated with presence information, including a human being, an electronic device, a computer program, or other entity. The subscriber 116 may have one or more presence states that may be relative to one or more endpoints 110. Table 1 shows examples of presence states and descriptions of the presence states.

TABLE 1

| Presence State | Description |
| --- | --- |
| 'Available' | The subscriber is in the office and available to receive messages. |
| 'On the Phone' | The subscriber is in the office, but is on the phone. |
| 'In Office' | The subscriber is in the office. |
| 'Be Right Back' | The subscriber is in the office but is not available. |
| 'In Meeting' | The subscriber is in the office but is not available because they are in a meeting. |
| 'On Business Trip' | The subscriber is not in the office and is not available to receive messages. |
| 'Out of Office' | The subscriber is not in the office and is not available to receive messages. |
| 'On Vacation' | The subscriber is not available to receive messages. |
| 'No Interruptions' | The subscriber is in the office but is not available to receive messages. |
| 'Working Remotely' | The subscriber is working and available, but not in the office. |
| 'Unknown' | It is not known whether the subscriber is available. |

The states above are exemplary. Different presence systems can have different states. Embodiments of the present invention can be easily adapted to the states available in a particular presence system. The presence states shown in Table 1 may be applicable to an individual subscriber 116. The presence states may also be applicable to other entities, including aggregate entities such as workgroups, group mailboxes or group phone connections. For example, a presence state may reflect the availability of a group of customer service representatives in a complaint department. When no representative is available to handle the call, the associated presence state may be 'On the Phone'. The presence information may reflect the availability of at least one member of the group, or may reflect other presence information applicable to the group as a whole.

For example, the 'Be Right Back' presence state indicates that the subscriber is in the office or otherwise available. However, the subscriber is temporarily away from the endpoint at which the subscriber receives messages. Different, fewer, or additional presence states may be used. As another example, the collection of presence states may simply be 'Idle', 'Busy', and 'Away'.

Presence states may also reflect an aggregated media state. The aggregated media states may apply to specific types of communication or may apply over any other subset of endpoints associated with the subscriber. As examples, the aggregated media states may apply to voice communications, video communications, instant messaging, application sharing, and email messaging. Accordingly, a subscriber that is associated with multiple endpoints (e.g., phone numbers, email addresses, or instant messaging addresses) may have a presence state that aggregates availability over any subset of the endpoints. For example, a subscriber with a desk phone and a cell phone may have an aggregated media presence state of 'Busy' when at least one of the phones is in use. As another example, the subscriber may have an aggregated media presence state of 'Available' when both phones are not in use. Table 2 shows examples of aggregated media states. Different, fewer, or additional aggregated presence states may be used.

TABLE 2

| Presence State | Note |
| --- | --- |
| 'Busy' | The subscriber is in the office but is currently busy. |
| 'Online' | The subscriber is in the office and is connected to an instant messaging service. |
| 'Offline' | The subscriber is disconnected from their instant messaging service. |
| 'Unknown' | The actual state of the subscriber is currently unknown. |
| 'Available' | The subscriber is in the office, and is not on the phone, interacting with instant messaging, or interacting with an email system. |

The endpoints 110 and/or subscribers 116 may communicate presence information to the presence information system 108. For example, the endpoints 110 may monitor subscriber activity and communicate a presence message to the presence information system 108. The presence message may indicate, as examples, that the subscriber has initiated a phone call, ended a phone call, started to type an instant message or email message, or may indicate any other presence information.

The presence state information may be communicated in the form of a presence document. The format of the presence document may adhere to any proposed or accepted standard for communicating presence information. In one implementation, the presence document is an extensible markup language (XML) document that identifies a subscriber and the presence or availability of the subscriber with respect to one or more 'addresses', including endpoints such as telephone numbers, email addresses, instant messaging addresses, or the like. When an endpoint publishes a presence document to the presence information system 108, the presence document typically only contains information about that particular endpoint. The presence information system 108 may then aggregate information from all of the subscriber's endpoints. The aggregate presence document may be made available in whole or in part to other endpoints that request the presence information.

The presence information system 108 receives the presence document. The systems 102-108 may process the presence documents and may maintain presence information for one or more subscribers. Alternatively or additionally, the messaging systems 102-106 may receive presence documents from the presence information system 108.

For example, the messaging system 102 may at any time poll or subscribe to the presence information system 108 for the current presence state of a subscriber. In response, the presence information system 108 may communicate a presence document for the subscriber to the messaging system 102. In such a case, the messaging system 102 acts as another endpoint with regard to receipt of presence information. The presence information system 108 need not send the presence document or populate the presence document with the requested information in every instance, however. Instead, the presence information system 108 may manage the availability of the subscriber presence state.

Figure 2:
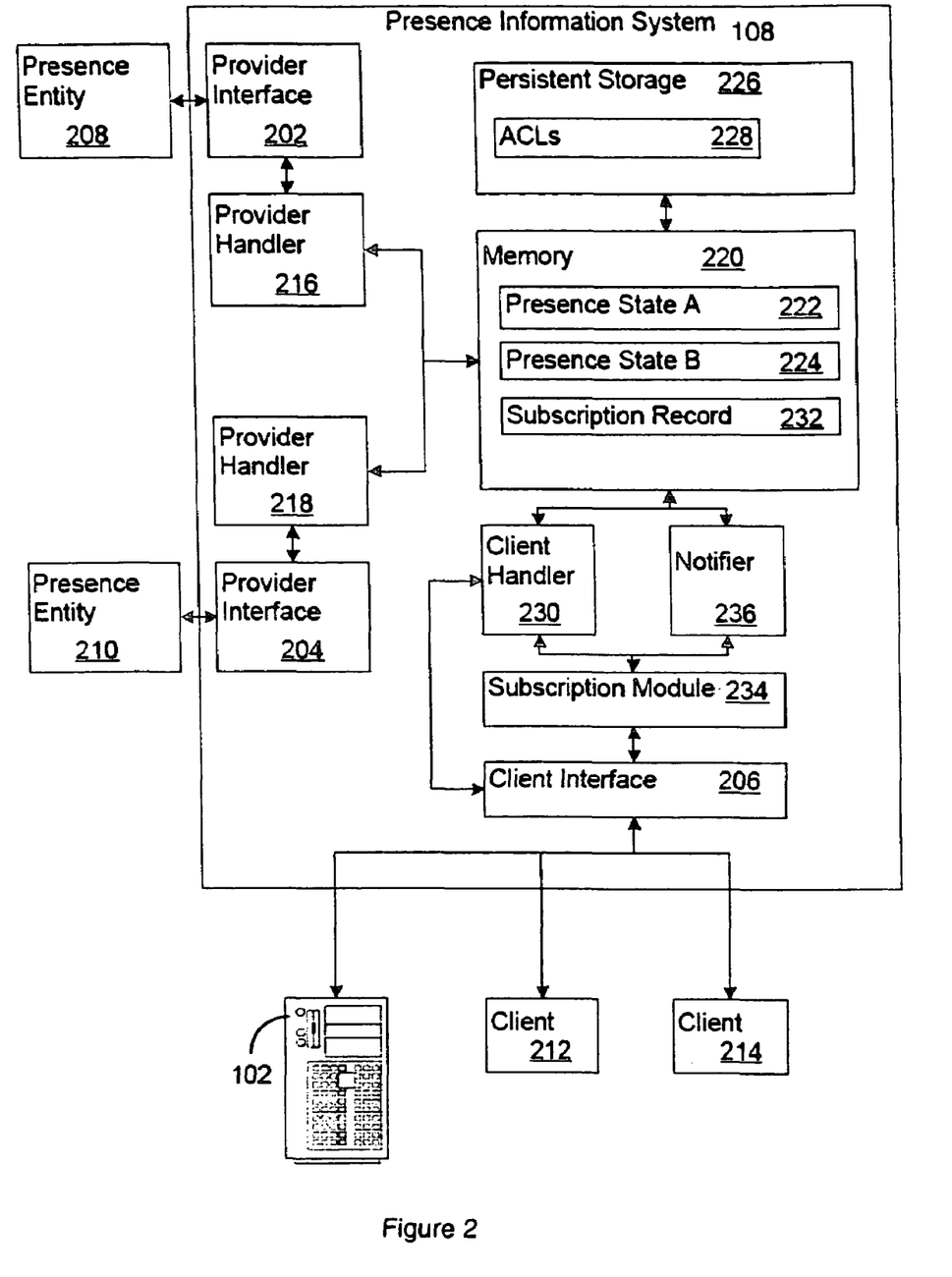
FIG. 2 shows one implementation of a presence state system.

FIG. 2 shows a block diagram of the presence information system 108. The presence information system 108 may be a server or a set of servers. The presence information system 108 may be connected to the networks 112 and 114 through a corporate intranet, a direct network connection, or other network connection.

The presence information system 108 may include one or more provider interfaces (e.g., the interfaces 202 and 204) and a client interface 206. The provider interfaces 202 and 204 may include circuitry and/or logic for communicating with presence entities (e.g., the entities 208 and 210), for example to receive presence information submitted by the entities 208 and 210. The client interface 206 may include circuitry and/or logic for communicating with the messaging system 102, programs, or other clients (e.g., the clients 212 and 214) that request presence state information.

The presence entities 208 and 210 may represent any subscriber, program, endpoint, device, or other entity that interacts with the presence information system 108. As examples, the presence entities 208 and 210 may be soft endpoints, hard endpoints, a Microsoft Office Communicator program, an IBM/Lotus Sametime Connect program, an AOL, MSN, Yahoo! instant messaging and presence program, a Siemens optiClient, or telephones, such as a Pingtel telephone or an optiPoint telephone. Additional examples include programs such as calendars, groupware, document management systems; or other endpoints such as the network or communications infrastructure (which may indicate 'busy' even for devices that do not have explicit presence reporting), or dynamic presence proxies.

Similarly, clients may take many forms. Soft endpoints, hard endpoints, thin clients (e.g., clients without substantial processing capabilities and/or local storage), or other clients may request and receive presence state information through the client interface 206. Programs such as groupware, document management, and other enterprise software also may request and receive presence state information.

The presence entities 208 and 210 may comply with the IETF proposals noted above, or may employ proprietary protocols. The provider handlers 216 and 218 may provide an abstraction layer. The handlers 216 and 218 may convert presence information received from the presence entities 208 and 210 into a uniform format that may be stored in the memory 220.

The handlers 216 and 218 may also aggregate one or more presence states into an aggregated media state. The presence information system 108 may maintain presence states (e.g., the presence states 222 and 224) in the memory 220. As presence states change, the memory 220 may be updated, and the presence information system 108 may communicate presence state update information to clients.

The presence information system 108 may store all or part of the presence states 222 and 224 in a persistent storage 226. The persistent storage 226 may include a database with tables that store presence state information for one or more subscribers. The persistent storage 226 may also include other presence related information, such as Access Control Lists 228 (ACLs) or other security information that may determine which clients may obtain presence information for which subscribers.

The client interface 206 may receive presence state information requests, subscription requests, and other requests from a client. The requests may be communicated to the client handler 230 for processing. The client interface 206 may also transmit presence state information, including subscribed presence state information updates to the client.

The client handler 230 may perform request or client validation and may attempt to satisfy the request. When the request is a query, fetch, or poll of presence state information, the client handler 230 may check the identity of the client against the ACLs 228 for the subscriber whose presence is being checked. If the client is allowed to obtain the presence state information, the presence state information is retrieved from the memory 220 or persistent storage 226 and returned to the client interface 206.

If the client is not allowed to see the presence state information, the client may receive a predetermined presence value. The predetermined presence value may be selected so that the value does not give hints about the subscriber's presence. To that end, the value may specify 'Unknown', 'Offline', or another presence value. Alternatively, the presence information system 108 may reject the request for presence information.

When the request is a subscription request, the presence information system 108 may store a subscription record 232 in the memory 220. The subscription record 232 may include identifiers or other data that indicates that a particular client is watching one or more subscribers. The subscription record 232 may also specify presence filters that limit or include specific types of presence state information for transmission to the client. For example a presence filter may specify that only 'Available' or 'Busy' presence states should be communicated to the client. The subscription module 234 may receive subscription requests and identifying information concerning the client that is watching the subscriber.

The presence information system 108 may activate the notifier 236. For example, the presence information system 108 may activate the notifier 236 when any of the presence states are modified and there are clients that are watching those presences states. The notifier 236 may include circuitry and/or logic that inform the subscription module 234 that a change in presence state has occurred. The subscription module 234 may process the new presence state in conjunction with the outstanding presence subscriptions. For example, the subscription module 234 may apply a filter to the new presence state to determine if the new presence state is one that the client desires to receive. If so, the client interface 206 may communicate the presence state update information to the client that placed the subscription.

Regarding email, the usefulness of e-mail is being threatened by three phenomena: spamming, phishing and e-mail worms. Spamming is unsolicited commercial e-mail. Because of the very low cost of sending e-mail, spammers can send hundreds of millions of e-mail messages each day over an inexpensive Internet connection. Hundreds of active spammers sending this volume of mail results in information overload for many computer users who receive tens or even hundreds of junk messages each day.

E-mail worms use e-mail as a way of replicating themselves into vulnerable computers. Although the first e-mail worm affected UNIX computers, the problem is most common today on the more popular Microsoft Windows operating system. The combination of spam and worm programs results in users receiving a constant drizzle of junk e-mail, which reduces the usefulness of e-mail as a practical tool.

As discussed above, an MTA can go down or become backed up for many reasons: routine maintenance, Denial-Of-Service attacks, virus checking, server failure, etc. When this occurs, MTA's upstream from the downed MTA continue to receive and queue messages. When the MTA comes up again, it is faced with an often daunting amount of email to deliver. It can take hours or even days to clear the backlog. Embodiments of the present invention enhances the resource delivery function so that it leverages presence information to prioritize the resource backlog, delivering the resource first to those users who are in presence states that indicate they are likely to want to access the resource and deferring delivery to other users who are not in those presence states. This does not shorten the actual total time required to clear the backlog, but it will generally give users the perception that the restoration process occurred more quickly than a strictly sequential restoration process would.

Figure 3:
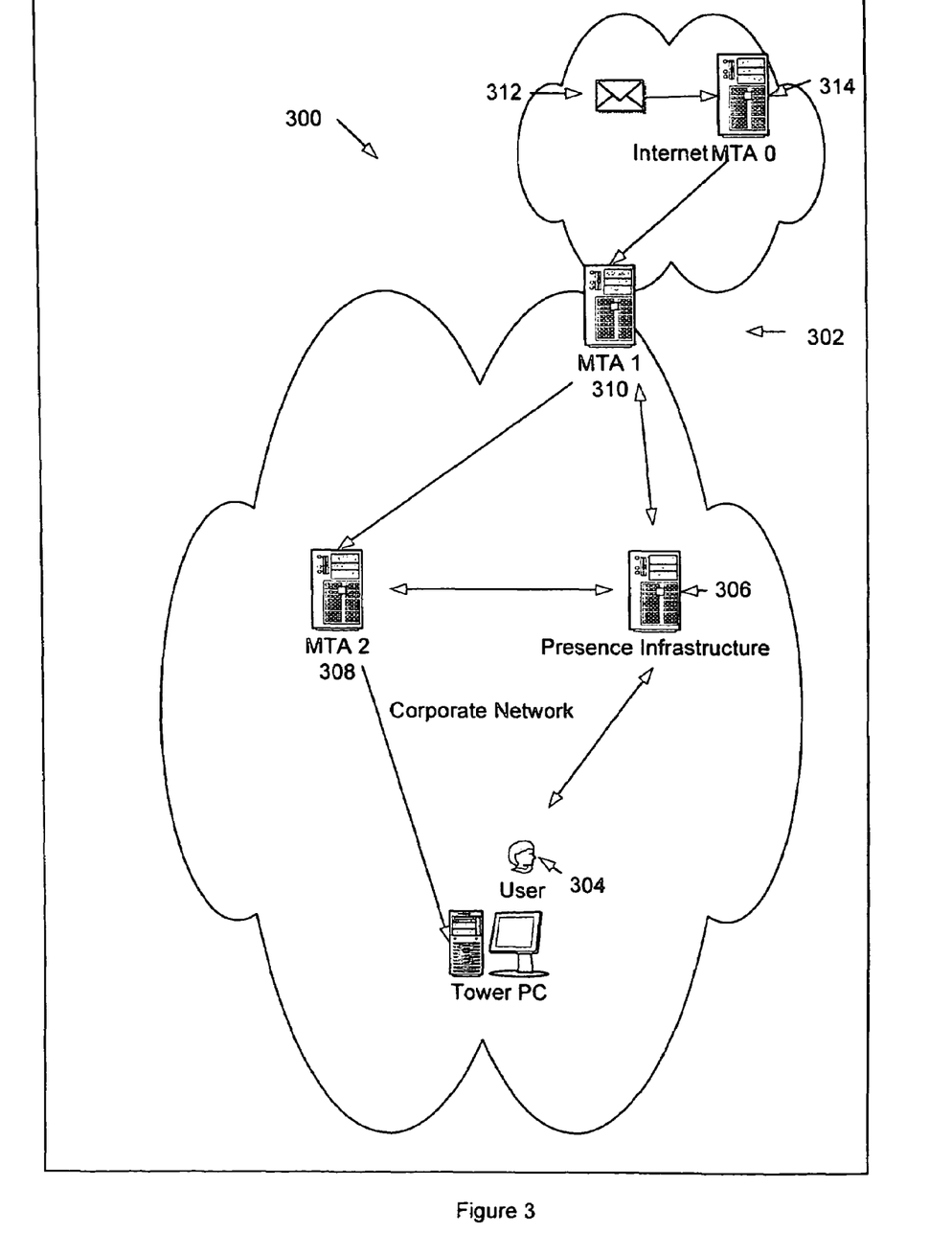
FIG. 3 shows an implementation of a presence enhanced disaster/overload recovery system in am embodiment of the present invention.

With reference to FIG. 3, an implementation of a presence enhanced disaster/overload recovery system in an embodiment of the present invention is shown. Presence enhanced disaster/overload recovery systems (recovery systems) 300 can be used to facilitate overload and disaster recovery for any resource (e.g., email, voicemail) that can be accessed randomly. For the purposes of the following description email will be used as the example resource.

The following description illustrates how the an email delivery system 302 enhanced with a recovery algorithm (discussed in more detail below) can optimize the way email 312 is delivered after the creation of an email backlog, no matter how the backlog was created.

User 304 interacts with presence system 306 either directly (e.g., user 304 sets presence to "In Office" or "Busy") or indirectly (user logs onto a presence/IM client or uses the telephone) to indicate the user's current presence state. Eventually, a Message Transfer Agent (MTA) goes down, e.g., MTA 2 308. However, entities continue to send messages to users who are accessed via MTA 2 308. Email 312 destined for MTA 2 308 users is stored on the closest MTA upstream from MTA2 308, which is MTA 1 310. Upon MTA 2 308 returning to service, MTA 1 310 detects that MTA 2 308 has returned to service and has a large backlog of messages that must be delivered through MTA 2 308 to the end users.

MTA 1 310 can use the presence of users 304 for which it has email 312 pending to determine the order in which messages should be delivered to MTA 2 308 and hence to end users 304. In one embodiment, users 304 in "more available" presence states can receive their email messages 312 faster than other users in "less available" presence states. It is further noted that the improved prioritization/delivery of the resource can be done without end user 304 performing any action. End user 304 would use their presence system 306 in a normal manner and the resource management utilizes the presence information to help users 304.

The entity managing the resource (MTA 1 310 in the example) uses its identity when querying for the presence of end users 304. MTA 1 310 can be configured as a "super user" and thus be given full access to all users 304, or it could be a "normal user and then end user 304 could choose to allow/block the entity from viewing his/her presence. This option would then allow end user 304 to "opt out" of the optimized recovery process. The contribution of the presence information to the backlog clearing algorithms can be either a key dictating factor or merely a contributing factor. The administration of the application that manages the resource could also have other criteria, such as giving priority to certain individuals (e.g., upper level management) or groups (e.g., board of directors).

The following table shows identity context presence values to illustrate a typical mapping for resource restoration:

| Identity Context | Restoration Priority (1 is highest priority) |
| --- | --- |
| In Office | 1 |
| Working Remotely | 2 |
| No Interruptions | 3 |
| In Meeting | 4 |
| Be Right Back | 5 |
| On Business Trip | 6 |
| Out of Office | 7 |
| On Vacation | 8 |
| Unknown | 9 |

It is fully contemplated that other priorities, levels of priorities, and organization of priorities could be used without departing from the spirit of the invention.

Figure 4:
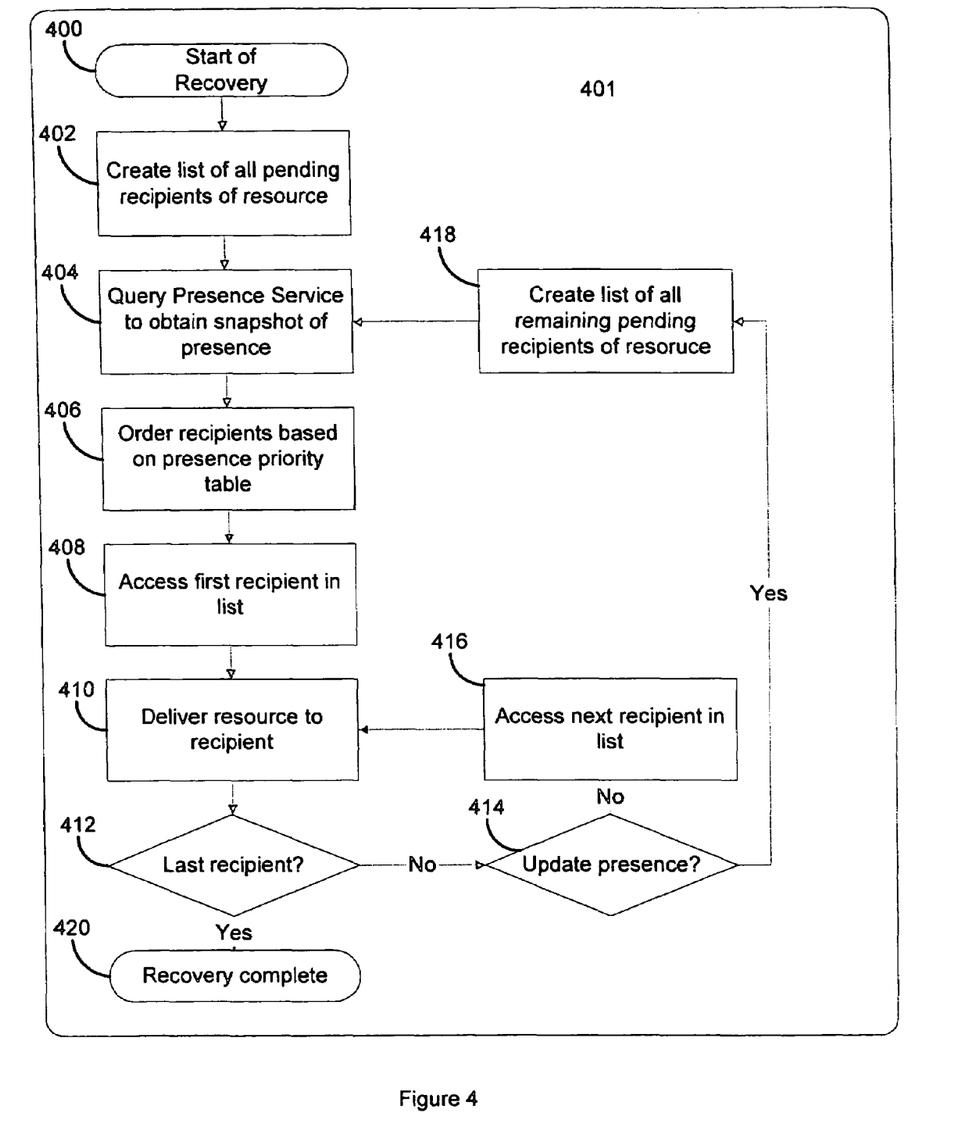
FIG. 4 shows a flow chart diagram of a recovery system algorithm in an embodiment of the present invention.

With reference to FIG. 4, a flow chart diagram of a recovery system algorithm in an embodiment of the present invention is shown. At state 400 a recovery algorithm 401 could begin the recovery process. Recovery algorithm 401 can then create a list of all pending recipients of the resource. Thus, all the entities that have a resource waiting to be delivered to them are put in a list at state 402. Recovery algorithm 401 can then request the presence of all pending recipients from presence service 306 at state 404. It is noted that service 306 and 108 are both a presence server/service. At state 406, algorithm 401 can now order the recipients based upon a presence priority table and/or the entity's importance as discussed in detail above. Thus those with the highest priorities are at the top of the list and those with the lowest are at the bottom of the list.

Algorithm 401 accesses the first recipient in the list at state 408. The backlogged resource can then be delivered to the recipient at state 410. Algorithm 401 then queries whether this is the last recipient on the list at state 412. If it is not the last recipient on the list, then algorithm 401 proceeds to state 414 where algorithm 401 queries whether to update the presence of the recipients. If the algorithm is instructed not to update the recipient's presence, then algorithm 401 proceeds to state 416 to access the next recipient in the list. If the algorithm is instructed to update the recipient's presence, algorithm 401 proceeds to state 418 to create a new list of remaining recipients awaiting resources. Algorithm 401 then proceeds to state 404 to obtain the updated presence of the remaining recipients and the process begins again up through state 412. Algorithm 401 can make the determination to update the presence in any number of ways, such as a predetermined time limit, a resource manager time limit, a predetermined number of resources delivered, or a resource manager number of resources delivered. Periodically updating the presence information is helpful for several reasons. First, the new list incorporates resource recipients that became backlogged during the recovery period. Secondly, the new list reflects changes in the resource recipients presence (and hence their priority in the recovery sequence) during the recovery period.

It is further contemplated that a resource management system could subscribe to the presence of the resource recipients. While this could be more computationally expensive, it would allow algorithm 401 to dynamically adjust to changes in the presence of the recipients effectively.

Figure 5:
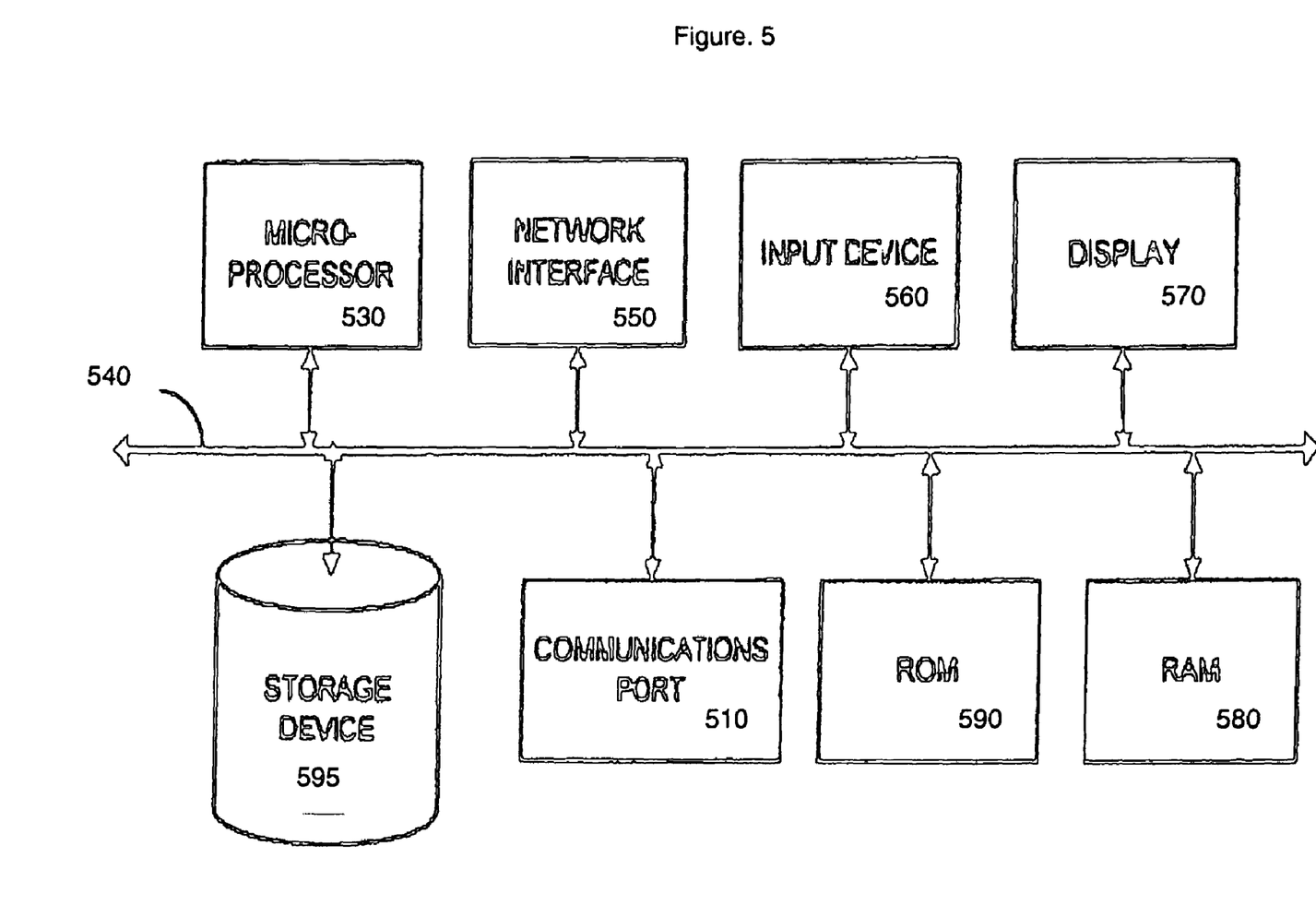
FIG. 5 shows a representative block diagram of computing device according to some embodiments of the present invention.

At state 412, if the last recipient has received their resource, then the recovery is complete and algorithm 401 proceeds to state 420 where algorithm 410 is terminated and the resource management system resumes normal operation FIG. 5 is a representative block diagram of a computing device according to some embodiments. It is understood computing devices 308, 310, or 314 could be used to execute algorithm 401 described above. Computing devices 308, 310, or 314 may comprise a single device or computer, a networked set or group of devices or computers, such as a workstation, laptop etc. Computing devices 308, 310, or 314 are typical of a data session-capable machine. Computing devices 308, 310, or 314 can include a microprocessor 530 in communication with communication bus 540. Microprocessor 530 is used to execute processor-executable process steps so as to control the components computing devices 308, 310, or 314 to provide functionality according to embodiments of the present invention. Microprocessor 530 may comprise a Pentium™, or Itanium™ microprocessor manufactured by Intel Corporation. Other suitable processors may be available from Motorola, Inc., AMD, or Sun Microsystems, Inc. Microprocessor 530 also may comprise one or more microprocessors, controllers, memories, caches and the like.

Input device 560 and display 570 are also in communication with communication bus 540. Any known input device may be used as input device 560, including a keyboard, mouse, touch pad, voice-recognition system, or any combination of these devices. Input device 560 may be used by a user to input information and commands and select a destination party (parties) to initiate instant messaging.

Display 570 may be an integral or separate CRT display, a flat-panel display or the like. Display 550 is generally used to output graphics and text to an operator in response to commands issued by microprocessor 530. Display 570 may display presentation data and the like which is used during the recovery session.

RAM (Random Access Memory) 580 is connected to communication bus 540 to provide microprocessor 530 with fast data storage and retrieval. In this regard, processor-executable process steps being executed by microprocessor 530 are typically stored temporarily in RAM 580 and executed therefrom by microprocessor 530. ROM (Read Only Memory) 590, in contrast, may provide storage from which data can be retrieved but to which data cannot be stored. Accordingly, ROM 590 may be used to store invariant process steps and other data, such as basic input/output instructions and data used during system boot-up or to control input device 560. One or both of RAM 580 and ROM 590 may communicate directly with microprocessor 530 instead of over communication bus 540, or on separate dedicated busses.

Data storage device 595 stores, among other data, processor-executable process steps of presence based recovery algorithm 401 discussed with respect to FIG. 4. The process steps and program code of algorithm 401 and the like may be read from a computer-readable medium, such as a floppy disk, a CD-ROM, a DVD-ROM, a Zip™ disk, a magnetic tape, or a signal encoding the process steps/program code, and then stored in data storage device 595 in a raw, compressed, uncompiled and/or encrypted format. In alternative embodiments, hard-wired circuitry may be used in place of, or in combination with, processor-executable process steps for implementation of the processes described herein. Thus, embodiments are not limited to any specific combination of hardware, firmware and software.

Also illustrated is a network interface 550 which may be a wired or wireless Ethernet interface, a modem interface, and so on. In utilizing the various embodiments of the invention, the network interface 550 may be connected to or to provide or access a high-speed connection to the Internet or an Intranet providing access to the Internet or similar networks. Using such a network or networks, computing devices 308, 310, or 314 can communicate identifiers of destination parties to a mobile application serve.

Stored in data storage device 595 may also be other elements that may be necessary for operation of computing devices 308, 310, or 314, such as other applications, other data files, a network server, an operating system, a database management system and "device drivers" for allowing microprocessor 530 to interface with external devices. These elements are known to those skilled in the art, and are therefore not described in detail herein.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managed content system recovery, the method comprising the steps of:
   beginning a recovery process;
   querying a presence system to determine a presence of each user; and
   distributing managed content based upon the presence of each user, wherein the presence of each user includes a first presence state and a second presence state, the managed content being distributed on prioritized basis with preference to the first presence state over the second presence state, the first presence state including at least one of available or in office, the second presence state including at least one of on vacation or out of office.

2. The method of claim 1, wherein the managed content is email.

3. The method of claim 1, wherein the managed content is voicemail.

4. The method of claim 1, further comprising the step of distributing the managed content based upon the user's importance.

5. The method of claim 1, further comprising the step of inputting a user's presence state.

6. The method of claim 1, further comprising the step of determining when the recovery process is complete.

7. A managed content recovery system comprising:
   a data storage device comprising:
      presence state submitted from at least one user; and
      a managed content recovery program that distributes managed content that has been backed up due to a backlog, based upon at least one user's presence state; and
   a processor coupled to the data storage device that executes the managed content recovery program, wherein the presence state includes a first presence state and a second presence state, the managed content is distributed on a prioritized basis with preference to the first presence state over the second presence state, the first presence state including at least one of available or in office, the second presence state including at least one of on vacation or out of office.

8. The system of claim 7, wherein the presence state is received directly or indirectly.

9. The system of claim 7, wherein the managed content is email.

10. The system of claim 7, wherein the managed content is voice mail.

11. The system of claim 7, wherein the managed content is also distributed based upon the at least one user's importance.

12. The system of claim 7, wherein the managed content recovery program creates a list of all pending recipients of the managed content resource.

13. A machine readable medium comprising machine executable instructions, including:
   query instructions to obtain a presence of participating presence users;
   order instructions that order participating presence users based upon a priority table; and
   delivery instructions that deliver backlogged managed content based upon the presence of participating presence users, wherein the presence of each participating presence user includes a first presence state and a second presence state, the managed content is distributed on the priority table with preference to the first presence state over the second presence state, the first presence state including at least one of available or in office, the second presence state including at least one of on vacation or out of office.

14. The medium of claim 13, further comprising creation instructions that create a list of all pending recipients of a managed content system.

15. The medium of claim 14, wherein The creating instructions further create a list of all remaining pending recipients after an initial delivery of backlogged managed content to prioritized users.

16. The medium of claim 13, wherein the user's presence state is received directly or indirectly.

17. The medium of claim 13, wherein the managed content is email.

18. The medium of claim 13, wherein the managed content is voice mail.

19. The medium of claim 13, wherein the delivery instructions also deliver the backlogged managed content based user's importance.

* * * * *